J. B. JOHNSON.
Machinery for Shaping Boot and Shoe Soles.
No. 141,058. Patented July 22, 1873.

Witnesses
S. N. Piper
G. N. Killes

Joseph B. Johnson,
by his attorney
R. N. Eddy

3 Sheets--Sheet 2.
J. B. JOHNSON.
Machinery for Shaping Boot and Shoe Soles.
No. 141,058. Patented July 22, 1873.
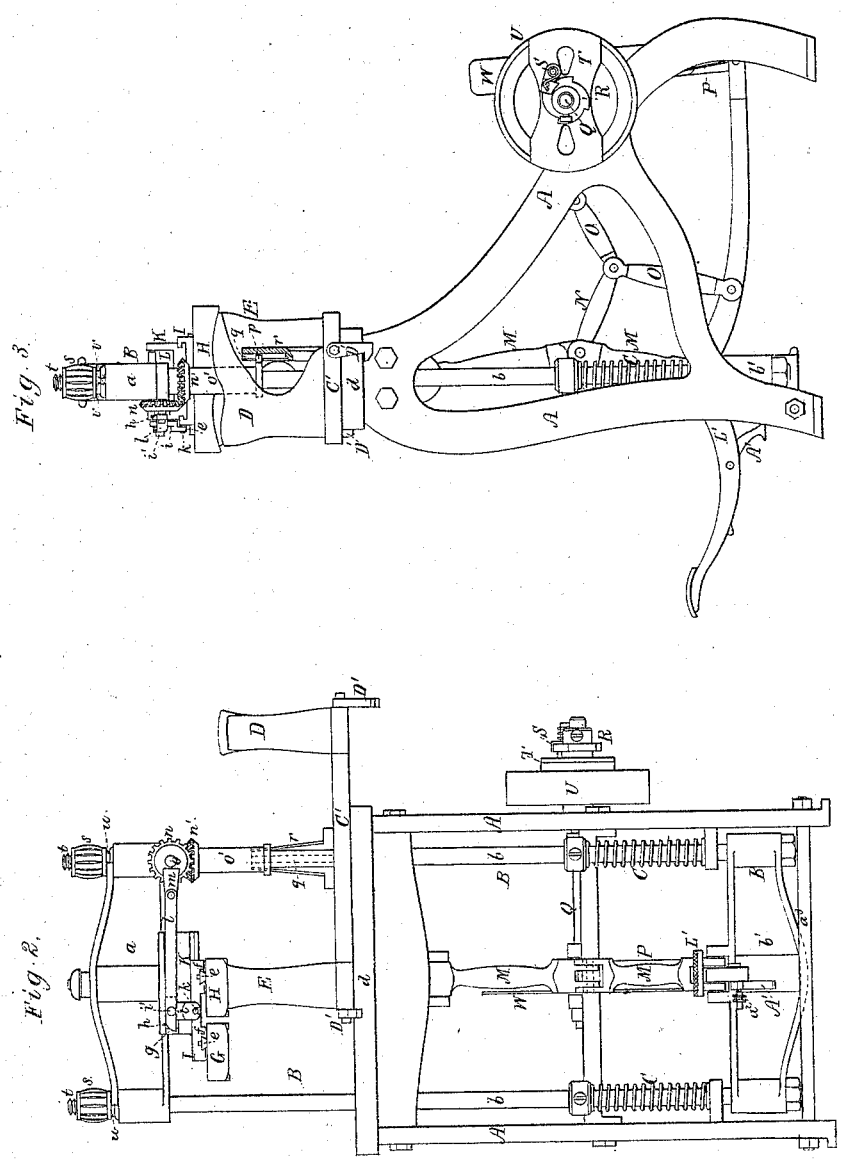

3 Sheets--Sheet 3.

J. B. JOHNSON.
Machinery for Shaping Boot and Shoe Soles.

No. 141,058. Patented July 22, 1873.

Witnesses Joseph B. Johnson.
by his attorney

UNITED STATES PATENT OFFICE.

JOSEPH B. JOHNSON, OF LYNN, MASSACHUSETTS, ASSIGNOR TO SWAIN, FULLER & CO., OF SAME PLACE.

IMPROVEMENT IN MACHINERY FOR SHAPING BOOT AND SHOE SOLES.

Specification forming part of Letters Patent No. 141,058, dated July 22, 1873; application filed June 25, 1873.

*To all whom it may concern:*

Be it known that I, JOSEPH B. JOHNSON, of Lynn, of the county of Essex and State of Massachusetts, have invented a new and useful Machine for Shaping or Molding Soles on Shoes, or fixed to the uppers thereof; and do hereby declare the same to be fully described in the following specification and represented in the accompanying drawings, of which—

Figure 1:
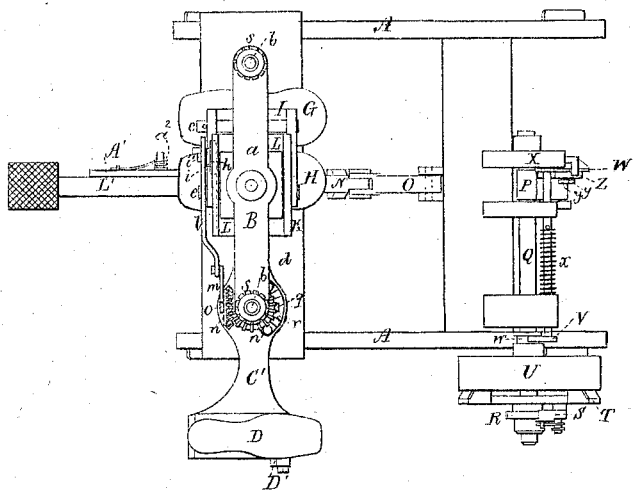
Figure 5:
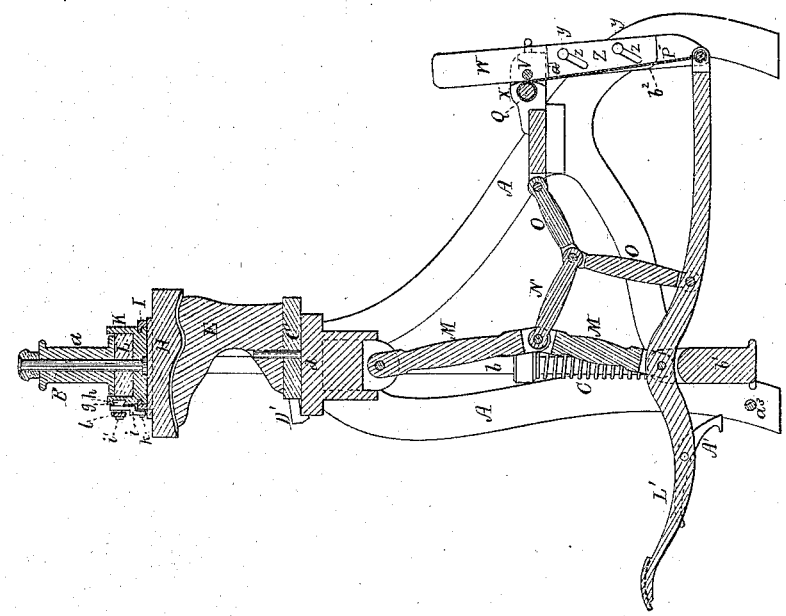
Figure 4:
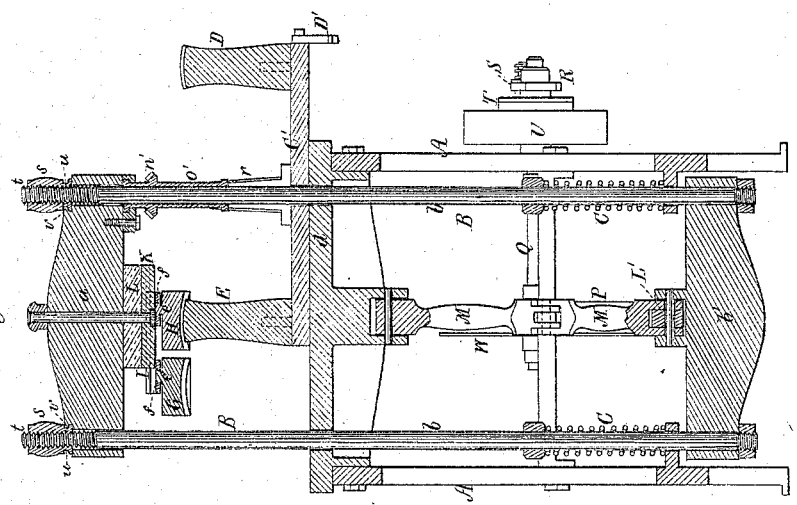

Figure 1 is a top view, Fig. 2 a front elevation, Fig. 3 a side elevation, Fig. 4 a transverse section, and Fig. 5 a longitudinal section, of the said machine.

In this machine I have combined, with the rotary auxiliary bar and its two lasts, two movable molds and mechanism for moving them alternately into one position, in order that each may operate with its last as occasion may require.

In patent No. 75,428, dated March 10, 1868, granted to me, I represented and claimed a single mold in connection with a rotary bar carrying two lasts, the whole being so arranged that by revolving the bar on its center either of the lasts could be brought directly underneath the mold. This enabled one shoe to be applied to the outer, while the sole of one on the inner of said lasts was in the act of being shaped or molded. With such a machine a pair of shoes termed "rights" and "lefts" could not be molded without substituting for a mold used for shaping a right-sole one for shaping a left sole. Consequently, in using the machine to advantage, all of one kind of the soles (as the rights, for instance) of a lot of pairs of shoes had to be first molded, after which the mold had to be removed and another substituted, calculated for molding the others or left soles.

With my present machine shoes termed rights and lefts of a pair may be molded successively, the machine containing one mold for a right and another for a left sole, and the molds are alternately brought into position for the right last to operate with the right mold and the left last with the left mold, one of such lasts being out for reception of a shoe, while the other is in and underneath its mold or in action therewith.

In the drawings, A denotes the frame of the press, and B its vertically-movable arch-bar frame, composed of the two horizontal cross-bars $a$ $b^1$, united by the vertical rods $b$ $b$, springs $c$ $c$, for the purpose of raising the said frame B after a depression of it, being suitably applied to the two frames A B. The rotary bar or last-carrier is shown at C', it being pivoted upon one of the rods $b$, and resting on the top plate $d$ of the frame A, and provided with one right and one left last, with its supporting-foot. These two lasts are exhibited at D and E. The bar C' is to be capable of being freely revolved on the rod. The two molds (one being a right and the other a left mold) are exhibited at G H as connected by dovetailed tongues and grooves $e$ $f$, with a carriage or slide, I. The said slide I is applied to a guide-piece, K, suspended from the upper cross-bar $a$, and having between it and such bar an elastic block or cushion, L. The mold-carrier I is to slide rectilinearly on the guide, which, on its front and above and parallel to the carrier, has a dovetailed groove, $g$ $t$, in which is a dovetailed slider, $h$. A furcated arm, $i$, extended down from the slide $h$, and provided with a stud, $i'$, embraces or receives between its prongs a stud, $k$, projecting from the mold-carrier. The furcated arm $i$ enables the mold to tip laterally in order to accommodate itself to the last or sole thereon without causing breakage or undue strain of the mechanism by which the mold-carrier is moved, such mechanism being herein next described.

The first part of it is a pitman or connecting-bar, $l$, provided with a notch to latch upon the stud $i'$. Such bar is pivoted to the wrist of a crank, $m$, projected from a bevel-gear, $n$, arranged as shown. This gear turns upon a pivot, $o$, projected from the frame B, and engages with another bevel-gear, $n'$, carried by a tubular shaft or sleeve, $o'$. The sleeve is arranged so as to revolve upon the rod $b$, and is provided with an arm, P, (shown in Fig. 3,) projecting into a vertical groove, $g$, formed in a post, $r$, elevated on the last-carrier C'.

From the above it will be perceived that each half revolution of the said carrier C' will cause the sleeve $o'$ to make a half revolution, whereby the requisite movement of the mold-carrier I will be effected. For depressing the molds or varying their vertical distance from the lower cross-bar $b^1$ of the frame B, I employ screw-nuts $s\ s$ to revolve on screws $t\ t$ of the rods $b\ b$. Each nut rests on the cross-bar $a$, and is grooved at $u$ to receive a projection, $v$, from the bar, the same being to enable the cross-bar to be either raised or lowered on the upright rod by simply revolving the nut one way or the other, as the case may require.

For depressing the frame B, in order to force a mold upon a shoe arranged in one of the lasts, there is applied and pivoted to the lower cross-bar of the said frame a treadle or foot-lever, L', arranged as shown, there being connected with such and the frame A two sets of toggles, M M and O O, provided with a pitman, N, all being arranged as represented. To the rear end of the lever a belt, P, is attached, it being at its upper end fixed to a shaft, Q. The said shaft, arranged as shown, has fixed upon it, near its outer end, a ratchet-wheel, R, to engage with a pawl, S. This pawl is pivoted to one side of a friction-clutch, T, which revolves freely on the shaft and co-operates with a pulley, U, in effecting rotary motion of the shaft Q. The said pulley also revolves freely on the shaft, and has a groove, $w$, in and around its hub, to receive a slide-fork, V, arranged as represented, and provided with a spring, $x$, for retracting it.

Figure 6:
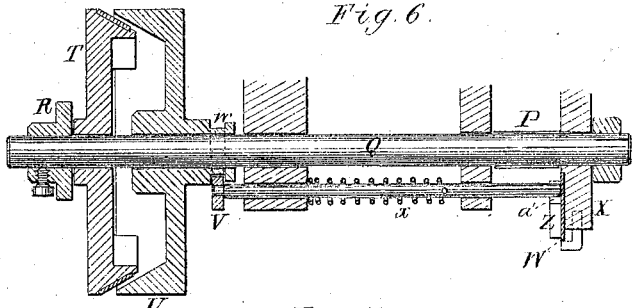

Fig. 6 is a longitudinal section of the shaft Q and its appliances.

Figure 7:
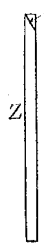

There is pivoted to the rear end of the treadle-lever L' a thin bar, W, which rests against a shoulder or projection, X, extended from the frame A, and extends between such and the inner end of the shank of the fork V. There is applied to the inner side of such bar W a gravitating cammed slide-plate, Z, it being held to the bar W by two headed studs, $y\ y$, going through inclined slots $z\ z$, made in the said plate, in manner as shown. The plate at its upper edge is beveled or wedge-shaped, as seen at $a^1$, (see Fig. 7,) which is an inner edge view of the gravitating plate.

If we suppose a driving-belt to be running upon the pulley U, the latter will be revolved on the shaft Q.

To operate the machine, an attendant is to depress with his foot the front arm of the treadle, which will descend until a lever-latch, A', pivoted to it and arranged and provided with an operative spring, $a^2$, as shown, may catch upon the cross-bar $a^3$ of the frame A. In thus depressing the treadle it will raise the bar W and the cam-plate Z thereof, carrying the latter against the end of the fork V, and thereby pushing such longitudinally, so as to force the driving-pulley against the friction-clutch in a manner to cause such pulley to revolve the clutch. As a consequence, the clutch, by means of the pawl and ratchet-wheel, will revolve the shaft Q, which will wind up the belt P and cause it to lift the rear arm of the treadle-lever, whereby the toggles will be put in action, so as to depress the frame B. This will continue until the curved corner $b^2$ of the cam-plate Z is raised above the end of the shank of the fork. As soon as the latter may have occurred, the retraction-spring of the fork will move the fork inward, and the latter will move the driving-pulley out of engagement with the friction-clutch. As a consequence, the shaft Q will cease to be revolved by the clutch, and the latch A' will catch upon the bar $a^3$, and retain the parts in position during the period the attendant may desire to have pressure of the mold exerted on the shoe-sole. At the end of this period the attendant, by pressing on the tail of the lever-latch, disengages the latch with the bar $a^3$, and thus sets free the treadle-lever. The frame B will next rise, and the treadle-lever be moved so as to depress the bar W and the belt P. In being drawn downward, the said belt will be unwound from the shaft Q, and will revolve it and the clutch backward. In the meantime the cam-plate Z will be moved aside by the shank of the fork, and subsequently, by gravity, will fall back underneath the shank, so as to be again ready for operating it.

The purpose of the pawl and the ratchet is to prevent the clutch, by the momentum generated in it, from continuing to revolve the shaft Q, so as to overstrain or break the belt P, which would be liable to occur were the clutch fastened to the shaft. As it is, when the shaft stops the clutch will revolve without turning the shaft.

To each end of the bar C' there is pivoted a pendulous latch or stop, D', which, by catching against the edge of the top plate $d$, serves to arrest the bar when it may be in the correct position for bringing the next adjacent last properly underneath its mold.

In said machine, I claim—

1. The combination of the movable mold-carriage I (or such and the two molds G H) and the mechanism for moving such carriage (or carriage and molds) laterally, as described, with the rotary bar C', or the latter and its two lasts D E, all being substantially as specified.

2. The slide $h$, furcated arm $i$, the studs $i'$ $k$, in combination with the mold-carriage and its operative mechanism, consisting of the notched bar $l$, crank $m$, gear $n\ n'$, sleeve $o'$, arm $p$, and grooved post $r$, applied to the bar C', as set forth.

3. The mechanism or combination for moving the mold-carriage laterally, such consisting in the notched bar $l$, crank $m$, gears $n\ n'$, sleeve $o'$, arm $p$, and the grooved post $r$, all being arranged and applied to the bar C' and to the mold-carriage either by a stud therefrom or by a slider and furcated arm and stud, as specified.

4. The combination of the treadle-lever L' and its system of toggles with mechanism, substantially as described, for operating such lever by a belt applied to a driving-pulley, U, such mechanism consisting of the driving-pulley U, the clutch T, the shaft Q, the belt P, the fork V, the retractive spring $x$, the bar W, and the cam-plate Z, all arranged and combined substantially as set forth.

5. The combination of the lever-operative mechanism and the pawl S and ratchet-wheel R, applied to the shaft and the clutch, the said pawl and ratchet being for the purpose specified.

6. The combination of the lever-latch A' and its operative spring $a^2$ with the treadle L, provided with mechanism for operating it, as described.

JOSEPH B. JOHNSON.

Witnesses:
R. H. EDDY,
J. R. SNOW.